Patented Aug. 26, 1930

1,774,381

UNITED STATES PATENT OFFICE

EDWIN F. KIEFER, OF CLEVELAND, OHIO, ASSIGNOR TO NATIONAL CARBON COMPANY, INC., A CORPORATION OF NEW YORK

ELECTRICALLY CONDUCTIVE ARTICLE

No Drawing.   Application filed March 29, 1927.   Serial No. 179,405.

The invention relates to electrically conductive articles fabricated by molding or otherwise forming a mixture of conductive powder and binder. Articles of this kind, which include for example brushes for electrical machines, contacts, resistors, and electrodes for electrolytic processes, must often possess a regulated degree of conductivity. The composition from which the articles are made should be adapted for molding, and the finished article should be permanent, resistance against highly corrosive agents being required for some uses. Other requirements such as those relating to strength, appearance, hardness, and ability to withstand heat must also be met in some instances.

I have discovered that compositions in which the conductive powder is graphite or other form of carbon or metal or alloy, and in which the binder is a cellulose derivative, such as a cellulose ester or ether, are well adapted to the manufacture of a large variety of articles of the class referred to. Charring of the binder during manufacture of the article is not contemplated as this would destroy its binding properties and otherwise impair qualities which the invention aims to secure.

Cellulose nitrate is a suitable binder in many instances. The following examples will illustrate the invention as applied to brushes.

A blend of three parts by weight of powdered copper and one part of graphite (both being grades of these materials heretofore employed in making brushes) was prepared, and mixed with a solution of nitrocellulose sold by Du Pont as a celluloid cement and a thinner sold by the same company for use with said cement in the proportions of 100 grams of the powdered blend, 15 cc. of cement and 15 cc. of thinner. The whole was mixed thoroughly and dried by exposing it in thin layers to the atmosphere for one hour, and brushes were then molded from it under pressure. The brushes were permitted to stand for several hours and were then gradually heated to 150° C., which temperature was maintained for two hours. The physical properties of the brushes were as follows:

Apparent density 4.20.
Resistance 0.0001 to 0.0005 ohms per inch cube.
Scleroscope hardness 17 to 21.

Another batch was made up without metal powder, 100 grams of powdered graphite being mixed with 30 cc. of the celluloid cement referred to and 30 cc. of the thinner. The mixture was dried, molded (under 20 tons per square inch) and baked as before. The following physical characteristics resulted:

Apparent density 1.96 to 2.08.
Resistance 0.0006 to 0.0010 ohms per inch cube.
Scleroscope hardness 5 to 7.

On test both the foregoing lots of brushes gave good results on small motors such as those used in toy railway trains, dictaphones, vacuum cleaners and household ice machines.

Many of the compositions embraced by the invention can readily be molded on metal studs, screws or the like to form contacts, and are suitable for such use.

I claim:

1. A hard and conductive brush for electrial machines consisting of comminuted highly conductive material bonded with cellulose nitrate.

2. A hard and conductive brush for electrical machines comprising comminuted highly conductive material bonded with a substance selected from the soluble cellulose esters and ethers.

In testimony whereof, I affix my signature.

EDWIN F. KIEFER.